(12) United States Patent
Mori (10) Patent No.: US 11,964,727 B2
(45) Date of Patent: Apr. 23, 2024

(54) VEHICLE

(71) Applicant: Striemo Inc., Tokyo (JP)

(72) Inventor: Yotaro Mori, Tokyo (JP)

(73) Assignee: Striemo Inc., Tokyo (JP)

(*) Notice: Subject to any disclaimer, the term of this patent is extended or adjusted under 35 U.S.C. 154(b) by 0 days.

(21) Appl. No.: 17/921,340

(22) PCT Filed: Jan. 20, 2021

(86) PCT No.: PCT/JP2021/001759
§ 371 (c)(1),
(2) Date: Oct. 25, 2022

(87) PCT Pub. No.: WO2021/220560
PCT Pub. Date: Nov. 4, 2021

(65) Prior Publication Data
US 2023/0202611 A1 Jun. 29, 2023

(30) Foreign Application Priority Data

May 1, 2020 (JP) .................................. 2020-080949

(51) Int. Cl.
*B62K 5/10* (2013.01)
*B62K 5/027* (2013.01)

(52) U.S. Cl.
CPC ................ *B62K 5/10* (2013.01); *B62K 5/027* (2013.01)

(58) Field of Classification Search
CPC ........... B62K 5/10; B62K 5/027; B62K 3/002
See application file for complete search history.

(56) References Cited

U.S. PATENT DOCUMENTS 4,047,732 A * 9/1977 Williams ............... B62K 3/002
280/220
4,050,712 A * 9/1977 Denzer ................ B62K 15/006
280/278
(Continued)

FOREIGN PATENT DOCUMENTS

CN 107487403 A * 12/2017 ............. B62L 3/023
DE 202013003063 U1 * 6/2013 ............. B62K 15/00
(Continued)

OTHER PUBLICATIONS

Hsueh, Jun. 2013, DE-202013003063-U1, Machine Translation of Specification.*
(Continued)

*Primary Examiner* — Paul N Dickson
*Assistant Examiner* — Matthew Joseph Ganci
(74) *Attorney, Agent, or Firm* — Duft & Bornsen, PC (57) ABSTRACT

A vehicle including a single front wheel arranged on a center line extending in a front-rear direction, two rear wheels arranged on a left side and a right side of the center line, a steering part arranged above the front wheel, a placement part on which feet of an occupant are placed, a first member rotatably supporting the front wheel and supporting the front wheel in a steerable manner by the steering part, a second member arranged behind the first member to rotatably support the two rear wheels, and a connecting part connecting the first member and the second member swingably in a left-right direction about an axial line extending in the front-rear direction. The placement part is supported by the second member.

15 Claims, 10 Drawing Sheets

(56) References Cited

U.S. PATENT DOCUMENTS

| | | | | |
|---|---|---|---|---|
| 4,065,146 | A | * | 12/1977 | Denzer .................... B62K 5/10 280/278 |
| 4,327,645 | A | * | 5/1982 | Yamazaki ............... E01B 27/14 104/13 |
| 4,666,018 | A | * | 5/1987 | Shibuya ............... B60G 11/225 180/213 |
| 9,610,998 | B1 | | 4/2017 | LaBonty |
| 2002/0020589 | A1 | * | 2/2002 | Tagami .................... B60T 1/005 188/31 |
| 2002/0027030 | A1 | * | 3/2002 | Tagami .................... B62K 5/06 180/21 |
| 2011/0031709 | A1 | * | 2/2011 | Kim ....................... B62K 3/002 280/62 |
| 2016/0229485 | A1 | * | 8/2016 | Hadley .................. B62K 3/002 |

FOREIGN PATENT DOCUMENTS

| | | | | | |
|---|---|---|---|---|---|
| EP | 3569214 | A1 | * | 11/2019 | ............... A61H 3/04 |
| JP | H08310254 | A | | 11/1996 | |
| JP | 3184391 | U | | 6/2013 | |
| JP | 2018144698 | A | | 9/2018 | |
| JP | 2020037411 | A | | 3/2020 | |
| KR | 1020100112932 | A | | 10/2010 | |
| WO | WO-2016005907 | A1 | * | 1/2016 | ............. B62K 19/18 |
| WO | WO-2019117481 | A1 | * | 6/2019 | ............. B62K 23/08 |

OTHER PUBLICATIONS

Zhu, Dec. 2017, CN 107487403 A, Machine Translation of Specification.*

Kang, Jun. 2019, WO-2019117481-A1, Machine Translation of Specification.*

Klitsch, Nov. 2019, EP-3569214-A1, Machine Translation of Specification.*

Hsueh, 2013, DE-202013003063-U1, Machine Translation of Specification.*

International Search Report; Application PCT/JP2021/001759; dated Apr. 6, 2021.

* cited by examiner

VEHICLE

CROSS-REFERENCE TO RELATED APPLICATION

This application is a National Stage of PCT international application Ser. No. PCT/JP2021/001759 filed on Jan. 20, 2021 which designates the United States, incorporated herein by reference, and which is based upon and claims the benefit of priority from Japanese Patent Application No. 2020-080949, filed on May 1, 2020, the entire contents of which are incorporated herein by reference.

TECHNICAL FIELD

This invention relates to a vehicle including a front wheel and a rear wheel.

BACKGROUND ART

Conventionally, there is a known electrically powered three-wheeled vehicle having a single front wheel and a pair of right and left rear wheels (for example, see Patent Literature 1). The vehicle described in Patent Literature 1 is equipped with a pair of left and right steps on which legs of an occupant in a standing posture are arranged inside the left and right rear wheels, and a handlebar above the front wheel to steer the front wheel, and the rear wheels are driven by an electric motor to drive the vehicle.

CITATION LIST

Patent Literature

Patent Literature 1: Japanese Unexamined Patent Publication No. Hei8-310254

DISCLOSURE OF INVENTION

Problems to be Solved by the Invention

However, in the vehicle described in Patent Literature 1, since the pair of steps are arranged inside the left and right rear wheels, a width of the vehicle increases, and thus there is room for improvement in vehicle turning performance.

Means for Solving Problem

An aspect of the present invention is a vehicle including: a front wheel arranged on a center line extending in a front-rear direction, the front wheel being configured by a single wheel; rear wheels arranged on a left side and a right side of the center line, the rear wheels being configured by two wheels; a steering part arranged above the front wheel; a placement part on which feet of an occupant are placed; a first member configured to rotatably support the front wheel and support the front wheel in a steerable manner by the steering part; a second member arranged behind the first member to rotatably support the two rear wheels; and a connecting part configured to connect the first member and the second member swingably in a left-right direction about an axial line extending in the front-rear direction. The placement part is supported by the second member.

Effect of the Invention

According to the present invention, it is possible to improve a turning performance of the vehicle.

DESCRIPTION OF EMBODIMENT

Now, an embodiment of the present invention will be described with reference to FIGS. 1 to 10B. A vehicle according to the embodiment of the present invention is a three-wheeled vehicle including a single front wheel and a pair of left and right rear wheels, and is formed such that a user can ride in a standing posture.

Figure 1:
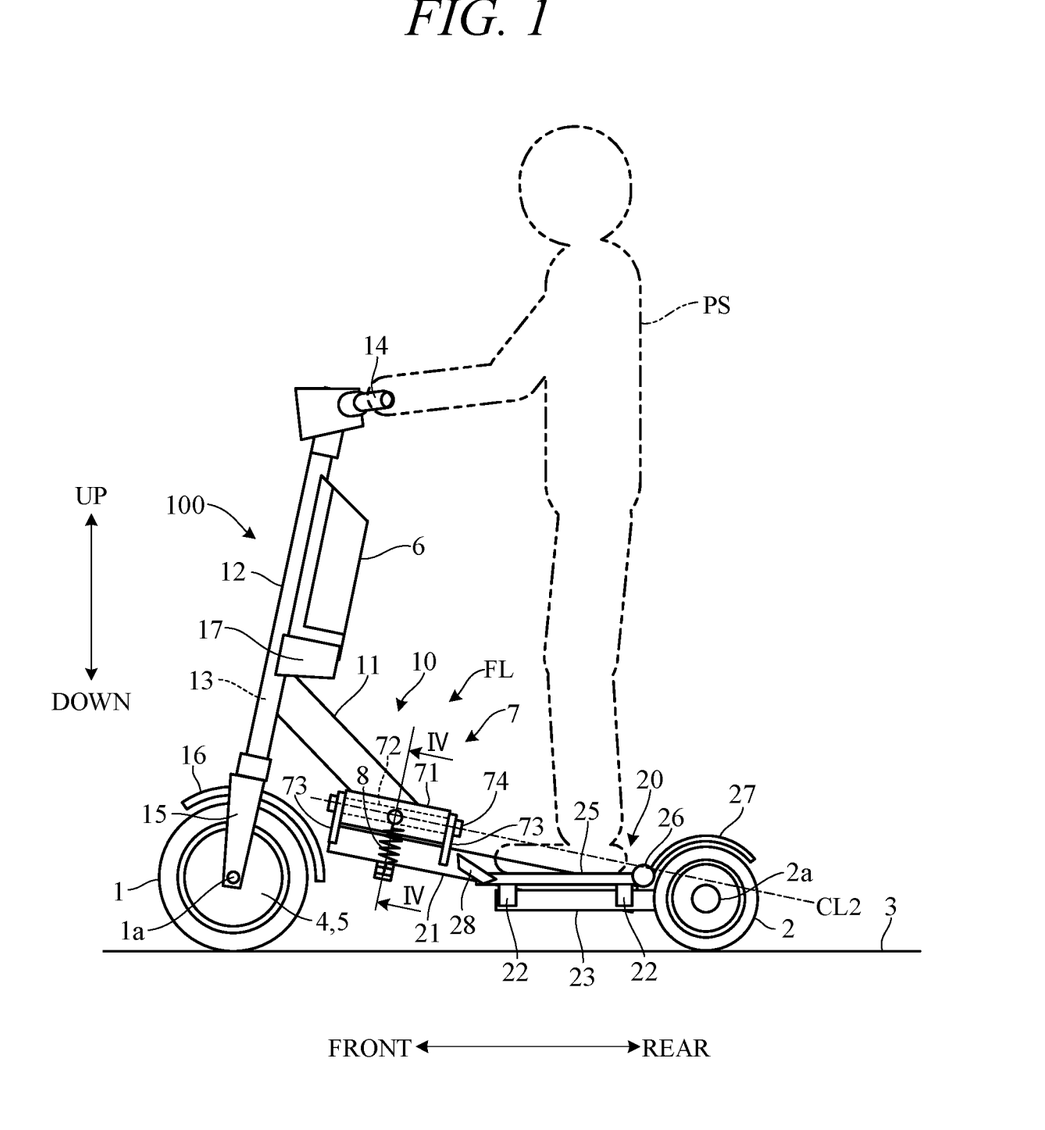
FIG. 1 is a side view illustrating an overall configuration of a vehicle according to an embodiment of the present invention.
Figure 2:
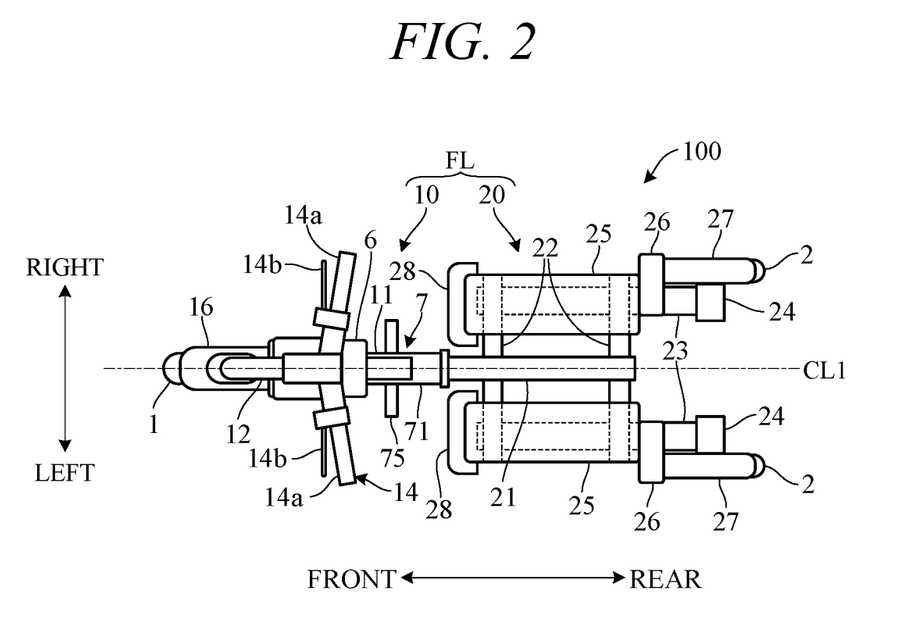
FIG. 2 is a plan view illustrating an overall configuration of a vehicle according to an embodiment of the present invention.

FIG. 1 is a side view illustrating an overall configuration of a vehicle 100 according to the embodiment of the present invention, and FIG. 2 is a plan view. FIG. 1 also illustrates a use state of a user PS (two-dot chain line). Hereinafter, the front-rear direction (length direction), the left-right direction (width direction), and the up-down direction (height direction) of the vehicle 100 are defined as illustrated, and a configuration of each unit will be described according to this definition.

As illustrated in FIGS. 1 and 2, the vehicle 100 includes a front wheel 1 and rear wheels 2, and a frame FL included in a skeleton of the vehicle 100, and is entirely symmetric with respect to a center line CL1 (FIG. 2) passing through the center of the vehicle 100 in the left-right direction. More specifically, the front wheel 1 is arranged along the center line CL1, and the left and right rear wheels 2 are arranged at symmetrical positions across the center line CL1. The front wheel 1 has a larger diameter than the rear wheels 2. The front wheel 1 may have the same diameter as the rear wheels 2, or the rear wheels 2 may have larger diameters than the front wheel 1. The frame FL includes a front frame 10 and a rear frame 20.

The front frame 10 includes a main frame 11 having a substantially rectangular cross section extending in the front-rear direction along the center line CL1, and a vertical pipe 12 having a substantially cylindrical cross section extending in the up-down direction. The main frame 11 is inclined at an upward slope toward the front (upward), and the front end portion thereof is joined to the rear surface of the vertical pipe 12. The vertical pipe 12 extends in an inclined manner such that the upper end portion is positioned behind the lower end portion, and a handlebar shaft 13 having a substantially circular cross section is rotatably inserted into the vertical pipe 12. The center portion of a handlebar 14 in the left-right direction is fixed to the upper end portion of the handlebar shaft 13, and a front fork 15 is fixed to the lower end portion of the handlebar shaft 13.

A rotary shaft 1a of the front wheel 1 is rotatably supported by the front fork 15. The front wheel 1 is steered by a turning operation of the handlebar 14 about the handlebar shaft 13. The handlebar 14 extends in the left-right direction, and grips 14a gripped by the user PS are provided at both left and right ends thereof. A substantially arc-shaped front fender 16 is attached to the front fork 15 so as to cover the periphery of the front wheel 1 from the upper side to the rear side of the front wheel 1.

Although not illustrated in detail, a traveling motor 4 (in-wheel motor) and a brake unit 5 are housed inside the front wheel 1. For example, the traveling motor 4 is arranged on the left side, and the brake unit 5 is arranged on the right side. The vehicle 100 is formed as an electric vehicle that travels by driving of the traveling motor 4. The brake unit 5 is formed as, for example, a drum brake unit included in a drum brake. Although not illustrated, the rear wheels 2 also include brake units. These brake units are operated by an operation of brake levers 14b provided in front of the grips 14a of the handlebar 14, and a braking force is applied to the front wheel 1 and the rear wheels 2. The traveling motor 4 may be provided in the rear wheels 2 instead of the front wheel 1, or in both the front wheel 1 and the rear wheels 2. As a result, the towing ability and the climbing ability can be improved.

A holder 17 is attached to the rear surface of the vertical pipe 12, and a battery 6 is supported by the holder 17. The battery 6 is a secondary battery such as a lithium ion battery in which electric power supplied to the traveling motor 4 as an electric motor is stored, and the electric power supplied from the battery 6 to the traveling motor 4 is controlled by a power control unit (not illustrated). Although not illustrated, at the handlebar 14, a display unit that displays vehicle information such as a remaining battery capacity and a set vehicle speed is provided, and a starter switch that gives an instruction of on and off of a main power supply, an accelerator lever that inputs a traveling command, and the like are provided so as to be operable by the user PS. The battery 6 may be arranged inside the vertical pipe 12, or may be arranged inside or around another structural member such as inside the main frame 11. For example, the battery 6 may be arranged on inclined portions 28 in front of steps 25.

The rear frame 20 includes a main frame 21 having a substantially rectangular frame shape cross section extending in the front-rear direction along the center line CL1, a pair of front and rear lateral frames 22 having substantially rectangular frame shape cross sections extending in the left-right direction across the main frame 21, and a pair of left and right side frames 23 having substantially rectangular frame shape cross sections extending in the front-rear direction in the left and right of the main frame 21. The main frame 21 extends to be inclined substantially parallel to an axial line CL2 at an upward slope toward the front (upward) below the front main frame 11. An angle formed by the rear main frame 21 with respect to the horizontal line (road surface 3) is smaller than an angle formed by the front main frame 11 with respect to the horizontal line. A frame member such as the main frame 11 may not be linear. For example, the frame member may be formed by bending a pipe, or may be formed by injection molding. Therefore, the relationship between angles formed by main frames 11 and 21 is not limited to that described above.

The pair of the front and rear lateral frames 22 is joined to the main frame 21 at a predetermined interval in the front-rear direction. For example, parts of the bottom surface of the main frame 21 are notched and the front and rear lateral frames 22 are attached to the main frame 21 so that the heights from the road surface 3 are the same. Pairs of left and right substantially U-shaped notches are provided on the bottom surfaces of the front and rear lateral frames 22, and the left and right side frames 23 are fitted in the notches and extend in the front-rear direction. Rear wheel support portions 24 are provided at the rear end portions of the left and right side frames 23, and rotary shafts 2a of the rear wheels 2 are rotatably supported by the rear wheel support portions 24.

The steps (footrests) 25 that are plate members having substantially rectangular shapes in plan view and extending in the front-rear direction are attached to the upper surfaces of the front and rear lateral frames 22 in the left and right of the main frame 21. The left and right steps 25 are included in a placement part on which the user PS in a standing posture places both feet, the lengths in the front-rear direction and the widths in the left-right direction of the steps 25 are defined such that the entire soles of the user PS can be placed. The upper surfaces (placement surfaces) of the steps 25 are formed as horizontal planes parallel to the road surface 3.

The left and right steps 25 are respectively arranged in front of the left and right rear wheels 2. The upper surfaces of the steps 25 are positioned below the upper ends of the rear wheels 2. The upper surfaces of the steps 25 may be positioned above the upper ends of the rear wheels 2 or at the same heights as the upper ends of the rear wheels 2. Bulging portions 26 bulging upward from the upper surfaces of the steps 25 are provided at the rear end portions of the steps 25. The bulging portions 26 protrude outward in the left-right direction from the outer end surfaces in the left-right direction of the steps 25. Rear fenders 27 are attached to the rear end portions of the bulging portions 26 so as to cover the peripheries of the rear wheels 2 from the front sides to the upper and rear sides of the rear wheels 2. The maximum width of the vehicle 100 is defined by the handlebar 14 or the rear fenders 27.

Inclined portions 28 inclined at an upward slope toward the front are provided at the front sides of the left and right steps 25. The inclined portions 28 extend in the left-right direction so as to cover the front end portions of the steps 25. By the inclined portions 28 and the bulging portions 26 being provided at both front and rear end portions of the steps 25 in this manner, the movement of the feet of the user PS in the front-rear direction can be restricted. In particular, the inclined portions 28 function as a protective member that protects the feet of an occupant, for example, in a case where the front end portions of the steps 25 collide with an obstacle on the road surface during traveling.

The front frame 10 and the rear frame 20 are swingably connected via a connecting portion 7. Hereinafter, a configuration of the connecting portion 7 will be described. As illustrated in FIG. 1, a pipe 71 having a substantially cylindrical shape about the axial line CL2 is integrally attached to the rear end portion of the front main frame 11. The axial line CL2 extends substantially in parallel to the rear main frame 21, that is, extends at an upward slope toward the front (upward) in the front-rear direction. Therefore, the pipe 71 is arranged above the main frame 21 substantially parallel to the main frame 21.

Figure 3:
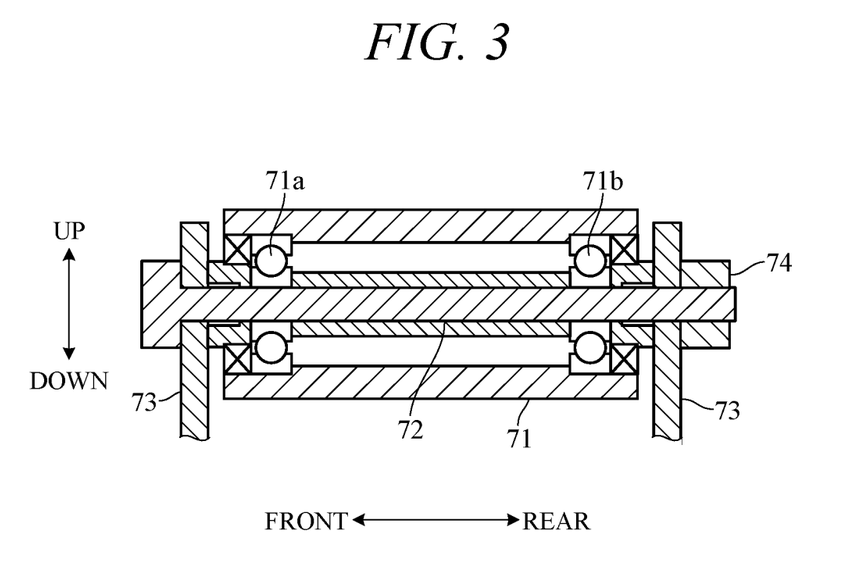
FIG. 3 is a cross-sectional view illustrating an internal configuration of a pipe included in the vehicle of FIG. 1.

Inside the pipe 71, a shaft 72 having a substantially circular cross section extends along the axial line CL2. The rear main frame 21 includes a pair of front and rear brackets 73 protruding upward so as to sandwich the pipe 71 in the front-rear direction. FIG. 3 is a cross-sectional view illustrating an internal configuration of the pipe 71. As illustrated in FIG. 3, a pair of front and rear bearings 71a and 71b are press-fitted into the pipe 71, and the shaft 72 is rotatably supported from the inner peripheral surface of the pipe 71 via the bearings 71a and 71b.

The shaft 72 has a head shape of a bolt at one end portion (front end portion) thereof and a screw portion at the other end portion (rear end portion) thereof. The shaft 72 penetrates the pair of the front and rear brackets 73, and a nut 74 is screwed to the rear end portion. Therefore, the position of the shaft 72 in the front-rear direction with respect to the pipe 71 and the brackets 73 is regulated, and the shaft 72 is fixed to the front and rear brackets 73 by an axial force of the screw of the shaft 72. As a result, the shaft 72 and the main frame 21 are integrally rotatable via the brackets 73.

With the above configuration of the connecting portion 7, the pipe 71 is supported so as to be rotatable about the axial line CL2 with respect to the main frame 21. In other words, the entire front frame 10 integrally including the pipe 71 is swingably supported in the left-right direction about the axial line CL2 with respect to the entire rear frame 20 integrally including the main frame 21.

Figure 4A:
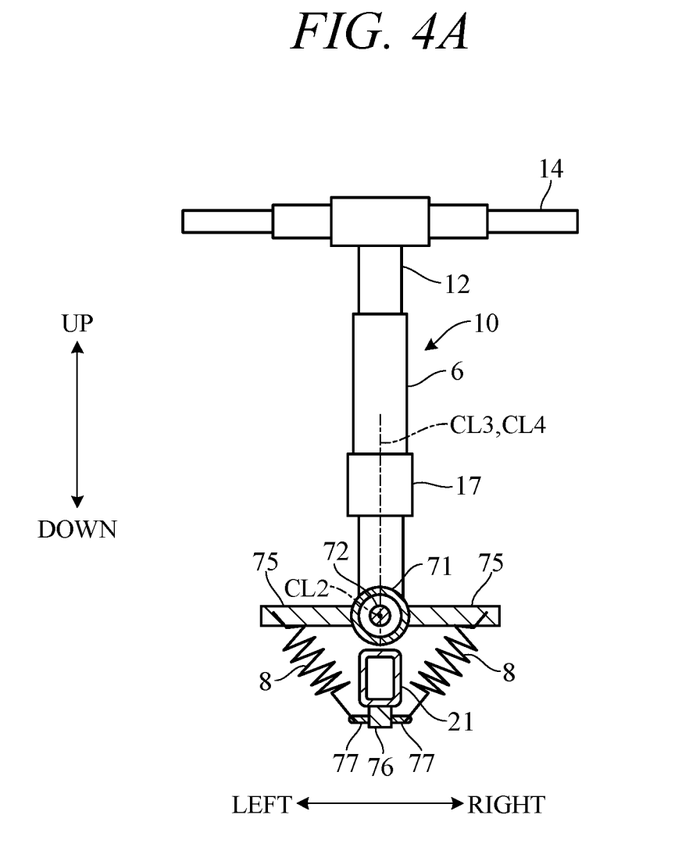
FIG. 4A is a cross-sectional view taken along line IV-IV of FIG. 1.

FIG. 4A is a cross-sectional view taken along line IV-IV of FIG. 1, that is, a cross-sectional view of the center portion of the pipe 71 in the front-rear direction. As illustrated in FIG. 4A, upper spring receivers 75 having substantially plate shapes are provided at left and right end portions of the pipe 71 so as to protrude outward in the left-right direction. On the other hand, a protrusion 76 is provided at the lower end of the main frame 21, and lower spring receivers 77 having substantially plate shapes are provided so as to protrude outward in the left-right direction at both left and right portions of the protrusion 76. The lengths of the lower spring receivers 77 in the left-right direction are shorter than the lengths of the upper spring receivers 75 in the left-right direction.

The upper end portions of a pair of left and right coil springs 8 are connected to both left and right end portions of the upper spring receivers 75, respectively, and the lower end portions of the left and right coil springs 8 are connected to both left and right end portions of the lower spring receivers 77, respectively. FIG. 4A illustrates a reference posture in which an angle (swing angle θ) formed by a vertical axial line CL3 passing through the center of the pipe 71 (axial line CL2), that is, a perpendicular line CL3 perpendicular to the road surface 3, and an axial line CL4 along the vertical pipe 12 of the front frame 10 is 0°. In the reference posture, the inclination angle of the front wheel 1 with respect to the road surface 3 is 0°, and the rotary shaft 1a of the front wheel 1 extends along the horizontal direction. If the user PS does not incline the front frame 10 in the left-right direction and torque in the left-right direction about the axial line CL2 does not act on the pipe 71, biasing forces of the left and right coil springs 8 are balanced with each other, and the vehicle 100 is kept in the reference posture as an equilibrium state.

Figure 4B:
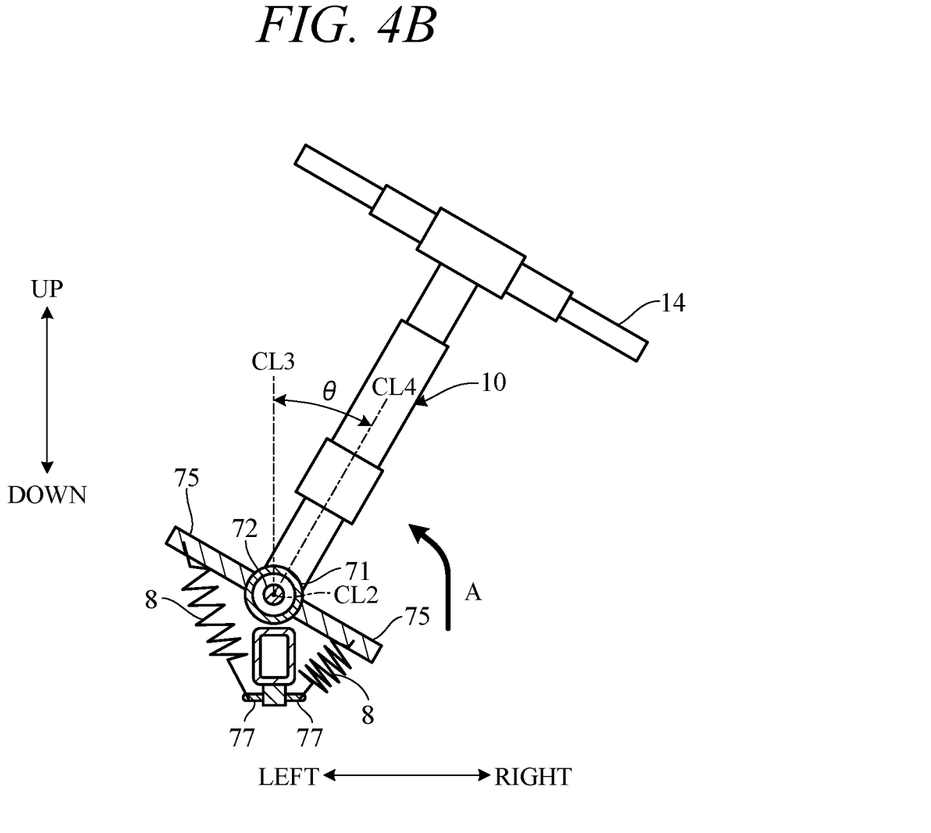
FIG. 4B is a view illustrating an example of an operation when a front frame swings from a state of FIG. 4A.

On the other hand, as illustrated in FIG. 4B, when the user PS inclines the front frame 10 in one of the left and right directions (for example, rightward), the swing angle θ increases, and torque about the axial line CL2 acts on the pipe 71. At this time, as compared with the state of FIG. 4A, the right coil spring 8 is retracted, and the left coil spring 8 is extended. As a result, biasing forces for returning the front frame 10 to the reference posture in the direction of an arrow A in FIG. 4B act on the front frame 10. The biasing forces increase as the swing angle θ increases. Therefore, rotational resistance acts on swinging of the front frame 10 by the coil springs 8 as a pair of right and left biasing members, and the swinging amount can be favorably restricted. When the torque acting on the pipe 71 is 0, the front frame 10 returns to the initial position (reference posture) by elastic forces of the coil springs 8.

Other biasing members may be provided separately from or in addition to the coil springs 8. For example, a substantially ring-shaped rubber member having an outer peripheral surface joined to the inner peripheral surface of the pipe 71 and an inner peripheral surface joined to the outer peripheral surface of the shaft 72 may be interposed between the pipe 71 and the shaft 72, and when the front frame 10 swings with respect to the rear frame 20, a biasing force for returning the front frame 10 to the reference posture may be applied by shear strain of the rubber member. Alternatively, a Neidhardt damper may be interposed inside the pipe 71.

Figure 5:
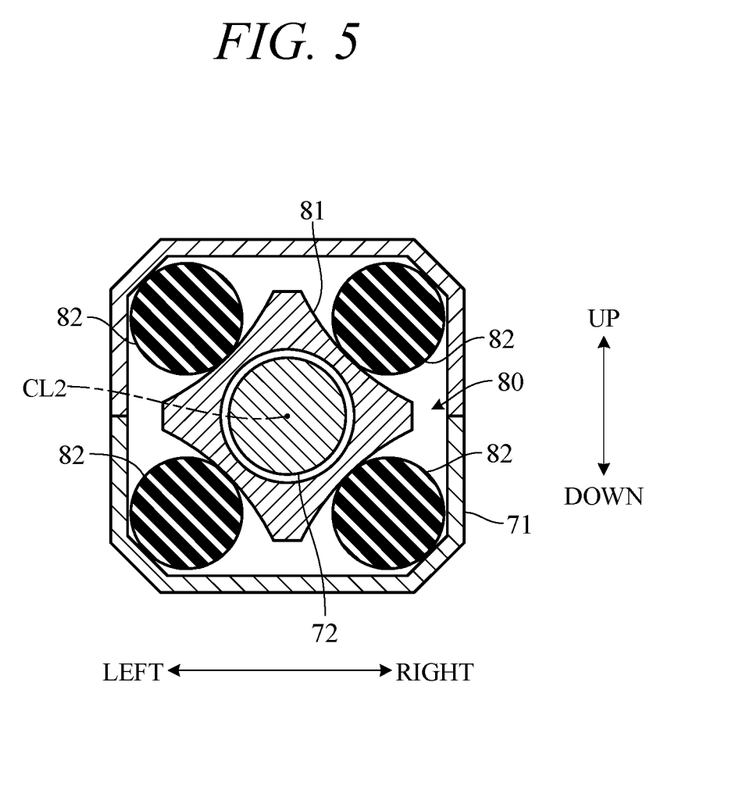
FIG. 5 is a cross-sectional view of a pipe included in a connecting portion in which a Neidhardt damper is incorporated.

FIG. 5 is a cross-sectional view of the pipe 71 in which a Neidhardt damper 80 is incorporated. In FIG. 5, the pipe 71 has a substantially rectangular frame shape cross section. As illustrated in FIG. 5, the Neidhardt damper 80 includes a substantially rhombic cam block 81 spline-connected to the shaft 72 so as to be rotatable integrally with the shaft 72, and rubber rollers 82 arranged so as to face the respective concave surfaces of the cam block 81. When torque acts on the pipe 71 in the initial state of FIG. 5 and the pipe 71 rotates about the axial line CL2, the rubber rollers 82 are pressed and elastically deformed between the pipe 71 and the cam block 81, and the rubber rollers 82 becomes elliptical. At this time, as the rotation angle of the pipe 71 increases, the rotational resistance to the pipe 71 increases. When torque acting on the pipe 71 is 0, the rubber rollers 82 return to the original shapes by elastic forces, and the front frame 10 returns to the reference posture.

Figure 6:
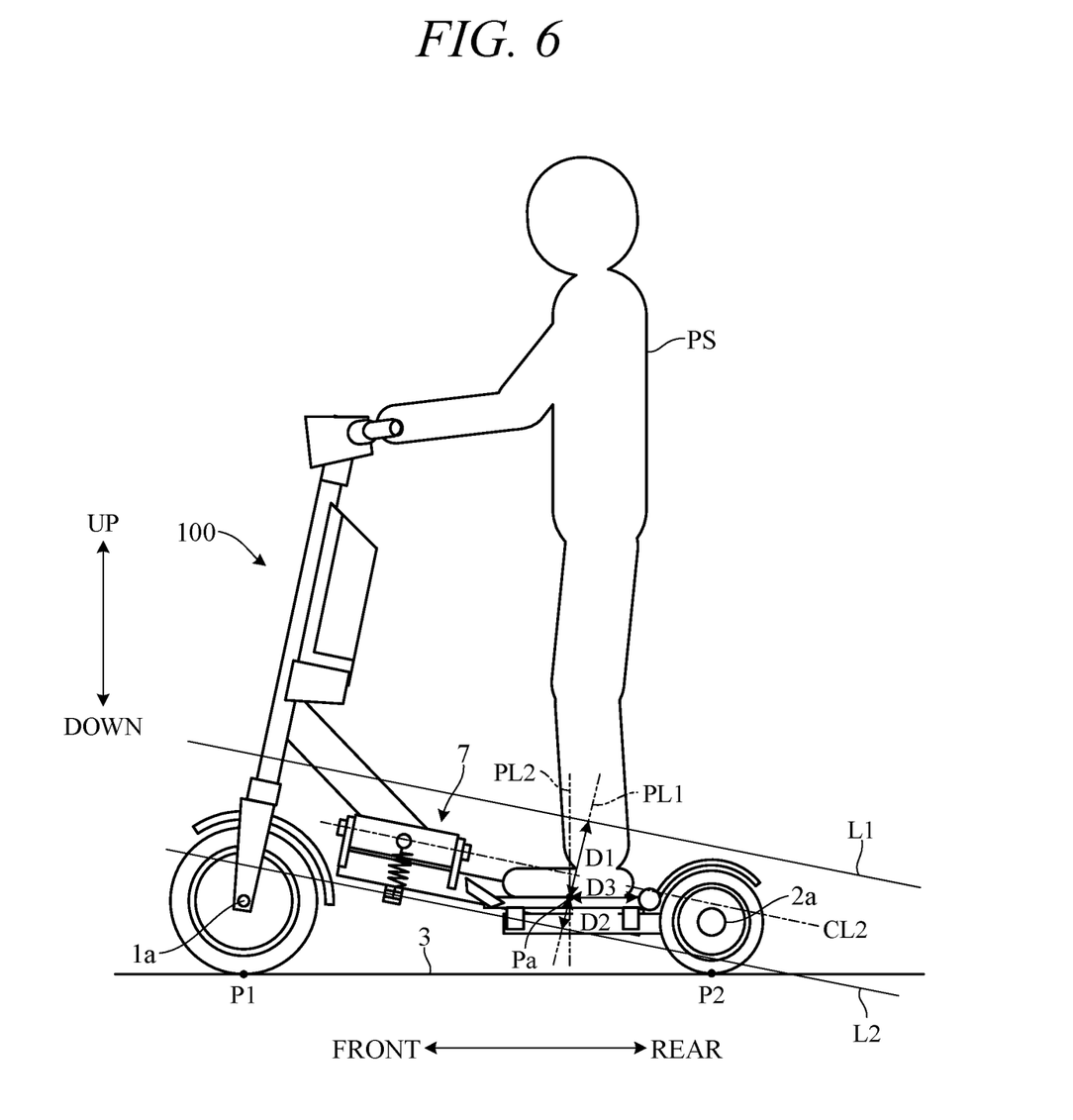
FIG. 6 is a side view of the vehicle illustrating a positional relationship between an axial line of the connecting portion and steps.

FIG. 6 is a side view of the vehicle 100 illustrating the positional relationship between the axial line CL2 of the connecting portion 7 and the steps 25. Hereinafter, points of action of forces acting on the steps 25 by the weight of an occupant are defined as load points Pa, and the center points of areas where the front wheel 1 and the rear wheels 2 are brought into contact with the road surface 3 are defined as ground points P1 and P2. The ground points P1 and P2 are points vertically below the rotation centers of the rotary shafts 1a and 2a, respectively.

As illustrated in FIG. 6, the load points Pa are positioned below the axial line CL2 on a virtual plane PL1 orthogonal to the axial line CL2. The load points Pa are also positioned below the axial line CL2 on a vertical plane PL2 perpendicular to the road surface 3. When turning the vehicle 100 in the left-right direction, the user PS slightly bends the knees and the ankles and inclines the upper body to the left or right. Thus, the user PS can swing the front frame 10 in a stable posture with both feet placed on the steps 25, and incline the front wheel 1 to the left or right. As a result, the vehicle 100 can be smoothly turned, and the turning performance is improved.

The axial line CL2 extends upward toward the front. Therefore, when the vehicle 100 turns, the turning angle of the front wheel 1 with respect to the rear wheels 2 can be increased. As a result, the turning radius can be reduced, and the turning performance can be further improved. In FIG. 6, the axial line CL2 passes above ground points P2, more specifically, above the rotary shafts 2a of the rear wheels 2 in a vertical plane passing through the ground points P2 of the rear wheels 2, but the axial line CL2 may pass below the rotary shafts 2a.

The axial line CL2 is preferably positioned between an imaginary line L1 above the load points Pa by a distance D1 (for example, 20 cm) and an imaginary line L2 below the load points Pa by a distance D2 (for example, 10 cm). By the connecting portion 7 being provided such that the axial line CL2 is positioned in such a range, the user PS can incline the front wheel 1 to the left and right in a stable posture when turning the vehicle 100, and the turning performance of the vehicle 100 is improved.

Figure 7:
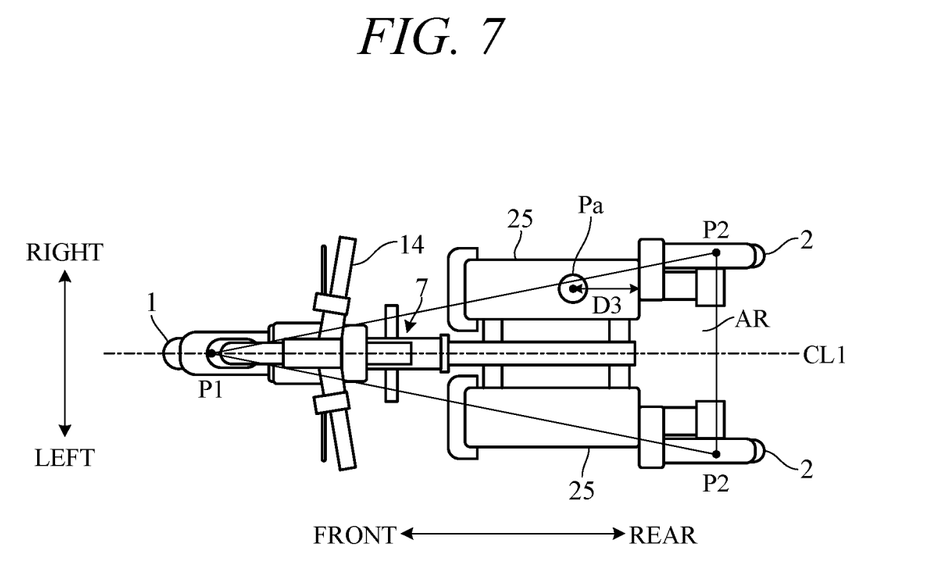
FIG. 7 is a plan view of the vehicle illustrating a position of a load point.

In this case, a distance D3 from the rear end portions of the steps 25 to the load points Pa is preferably within a predetermined range (for example, 5 cm to 15 cm). FIG. 7 is a plan view illustrating the position of a load point Pa on a right step 25. As illustrated in FIG. 7, when the distance D3 from the rear end portion of the step 25 to the load point Pa is within the above predetermined range, the load point Pa is positioned inside a triangular area AR obtained by connecting the ground point P1 of the front wheel 1 and the ground points P2 of the left and right rear wheels 2.

Therefore, the user PS can get on the vehicle 100 in a state where the posture of the vehicle is stable, and thus the user PS can easily get on the vehicle. That is, when the user PS places his/her foot on one (for example, the right side) of the steps 25 to apply his/her own weight, and then places his/her foot on the other (for example, the left side) of the steps 25 to perform a riding operation on the vehicle 100, since the load point Pa is positioned in the area AR, the other rear wheel 2 can be prevented from rising at the time of the riding operation, and the vehicle posture is stabilized. Furthermore, when the vehicle 100 turns with the front side inclined in traveling, a rear wheel 2 on the inner side in the turning direction can be prevented from rising. When the vehicle stops, the user PS can maintain a stable posture while placing both feet on the steps 25.

According to the present embodiment, the following operations and effects are achievable.

(1) The vehicle 100 includes the single front wheel 1 arranged on the center line CL1 extending in the front-rear direction, the pair of the left and right rear wheels 2 arranged in both left and right of the center line CL1, the handlebar 14 arranged above the front wheel 1, the steps 25 on which the feet of a user PS are placed, the front frame 10 that rotatably supports the front wheel 1 and steerably supports the front wheel 1 in accordance with an operation of the handlebar 14, the rear frame 20 that is arranged behind the front frame 10, rotatably supports the rear wheels 2, and integrally includes the steps 25, and the connecting portion 7 that swingably supports the front frame 10 in the left-right direction with respect to the rear frame 20 about the axial line CL2 extending in the front-rear direction (FIG. 1). The steps 25 are provided such that the load points Pa acting on the steps 25 by the weight of the user PS are positioned in the area AR connecting the ground point P1 of the front wheel 1 and the respective ground points P2 of the pair of the left and right rear wheels 2 in plan view (FIG. 7).

Since the front frame 10 supporting the single front wheel 1 is swingably supported via the connecting portion 7 with respect to the rear frame 20 supporting the pair of the left and right rear wheels 2 in this manner, the front wheel 1 is inclined at the time of turning, and the turning performance of the vehicle 100 is improved. Furthermore, since the steps 25 are provided such that the load points Pa acting on the steps 25 are positioned in the area AR of the ground points P1 and P2, the steps 25 do not need to be arranged on the left and right inner sides of the pair of left and right rear wheels 2. Therefore, while expansion of the vehicle 100 in the vehicle width direction is suppressed, the user PS can get on the vehicle 100 in a stable posture even when turning the vehicle.

(2) The steps 25 are the pair of the left and right steps 25 provided in the left and right of the center line CL1, respectively, and the pair of the left and right steps 25 are provided so that the load points Pa are positioned in the triangular area AR in plan view (FIG. 7). As a result, the user PS can get on the vehicle in a stable posture even in a case where the weight of the user PS extremely acts on one of the left and right steps 25 during traveling or stopping.

(3) The connecting portion 7 is provided such that the axial line CL2 is inclined downward toward the rear (FIG. 1). As a result, the turning angle of the front wheel 1 at the time of turning increases, and the turning performance of the vehicle 100 can be improved.

(4) The diameter of the front wheel 1 is larger than the diameters of the rear wheels 2 (FIG. 1). As a result, the steps 25 can be provided at low positions via the side frame 23 supporting the rear wheel 2, and the getting on and off property of the user PS for the vehicle 100 is enhanced.

(5) The steps 25 are provided such that the load points Pa are positioned below the axial line CL2 on the virtual plane PL1 orthogonal to the axial line CL2 (FIG. 6). As a result, the load points Pa can be brought closer to the road surface 3, and the stability of the user PS is further enhanced.

(6) The vehicle 100 further includes the coil springs 8 that apply turning forces about the axial line CL2 to the front frame 10 (pipe 71) such that the front wheel 1 takes the reference posture in a case where the posture of the front wheel 1 in which the rotary shaft 1a of the front wheel 1 is directed in the horizontal direction is set as the reference posture (FIG. 4A). As a result, the front frame 10 can automatically return from an inclined posture to the reference posture by spring forces, and the vehicle can be parked in a stable posture.

(7) The coil springs 8 are formed as an elastic connecting portion so as to elastically connect the front frame 10 (pipe 71) and the rear frame 20 (main frame 21) (FIG. 4A). As a result, biasing forces can be applied to the front frame 10 using a simple configuration.

(8) The coil springs 8 are arranged in both left and right of the axial line CL2 (FIG. 4A). As a result, the biasing members are formed to be symmetrical in the left-rear direction, and biasing forces can be similarly applied even when the front frame is inclined in any of the left and right directions.

(9) The steps 25 are arranged in front of the rear wheels 2 (FIG. 1). As a result, an increase in the vehicle width can be suppressed, and the vehicle 100 having excellent mobility and portability can be formed.

(10) The vehicle 100 further includes the traveling motor 4 that drives the front wheel 1 and the battery 6 that supplies electric power to the traveling motor 4 (FIG. 1). As a result, a driving unit such as a pedal is unnecessary, and the vehicle 100 can be easily formed.

Figure 8:
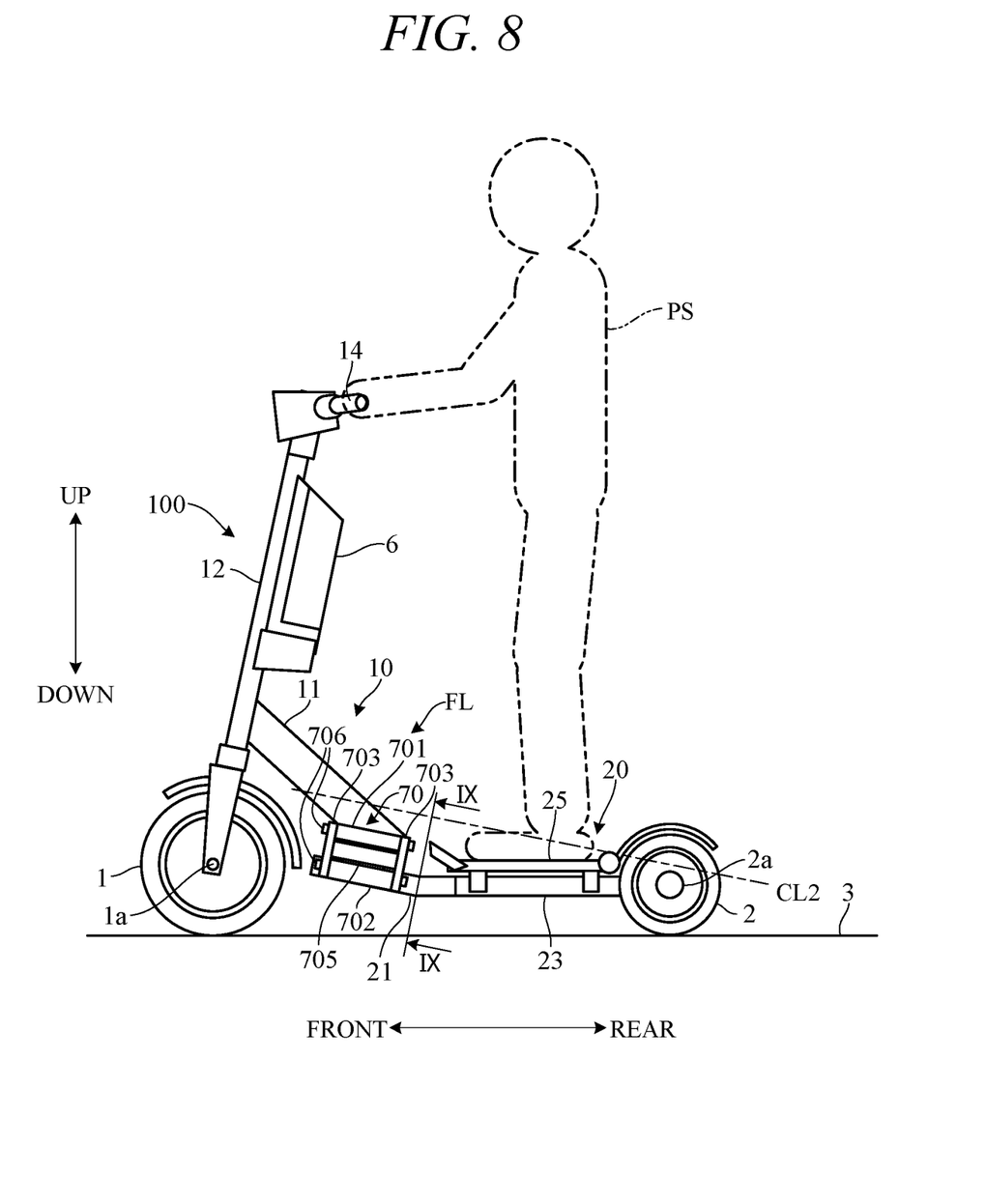
FIG. 8 is a side view of the vehicle illustrating a modification of FIG. 1.

Although in the above embodiment (FIG. 3), the brackets 73 are arranged on both front and rear sides of the pipe 71, and the front frame 10 and the rear frame 20 are swingably connected via the shaft 72 penetrating the pipe 71 and the brackets 73 along the axial line CL2. However, the configuration of a connecting part is not limited thereto. FIG. 8 is a side view illustrating an overall configuration of the vehicle 100 having another connecting part, and FIG. 9 is a cross-sectional view illustrating a configuration of a main part of the connecting part in FIG. 8 (cross-sectional view taken along line IX-IX in FIG. 8).

Figure 9:
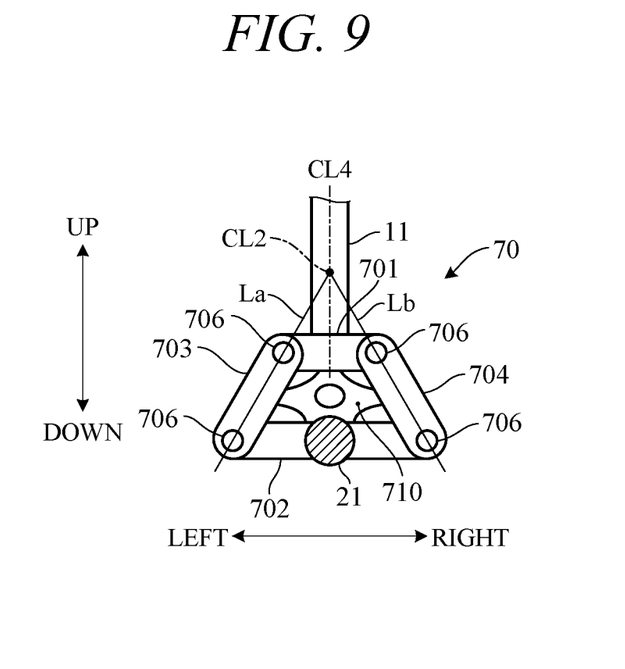
FIG. 9 is a cross-sectional view taken along line IX-IX of FIG. 8.

As illustrated in FIGS. 8 and 9, a connecting portion 70 provided between the front main frame 11 and the rear main frame 21 is configured by trapezoidal links having a substantially trapezoidal shape in rear view. More specifically, the connecting portion 70 includes a substantially plate-shaped horizontal link 701 fixed to the lower end portion of the main frame 11, extending in the left-right direction centering around the main frame 11, and extending in parallel to the axial line CL2, a substantially plate-shaped horizontal link 702 fixed to the left and right side surfaces of the main frame 21, extending in the left-right direction centering around the main frame 21, and extending in parallel to the axial line CL2, a pair of substantially plate-shaped front and rear connecting links 703 connecting the left end portion of the horizontal link 701 and the left end portion of the horizontal link 702, and a pair of substantially plate-shaped front and rear connecting links 704 connecting the right end portion of the horizontal link 701 and the right end portion of the horizontal link 702, and is symmetrical in the left-right direction as a whole. The lower horizontal link 702 is longer than the upper horizontal link 701. The lower horizontal link 702 may be shorter than the upper horizontal link 701, and the configuration of a link mechanism is not limited to the illustrated configuration. The front and rear connecting links 703 and 704 are integrally connected via substantially plate-shaped connecting plates 705 extending in parallel to the axial line CL2.

The connecting links 703 and 704 are rotatably supported by the horizontal links 701 and 702 via shaft portions 706 extending in parallel to the axial line CL2. As illustrated in FIG. 9, a rubber block 710 that is a block-shaped rubber material as an elastic body is arranged inside the trapezoidal links. The rubber block 710 is fixed to each of the upper and lower horizontal links 701 and 702 and to the left and right connecting links 703 and 704 or the connecting plates 705. The configuration of an elastic body is not limited thereto. For example, the elastic body may be formed from urethane, or an elastic body other than a rubber material or urethane may be used. An intersection of a straight line La passing through the centers of a pair of upper and lower shaft portions 706 on the left side and a straight line Lb passing through the centers of a pair of upper and lower shaft portions 706 on the right side corresponds to the axial line CL2 that is the center line of swing.

Similarly to FIG. 4A, FIG. 9 illustrates the reference posture in which the swing angle is 0°. In the reference posture, the rubber block 710 maintains an equilibrium state, and the axial line CL2 is positioned on the axial line CL4 along the vertical pipe 12 above the horizontal link 701 (see FIG. 4A). When the user PS inclines the front frame 10 in one of the left and right directions (for example, leftward) from this state, leftward torque acts on the connecting portion 70 (horizontal link 701) via the main frame 11. As the torque increases, the swing angle (angle θ of the axial line CL4 with respect to the vertical line) increases as illustrated in FIGS. 10A and 10B, and the rubber block 710 is pressed and elastically deformed.

Figure 10A:
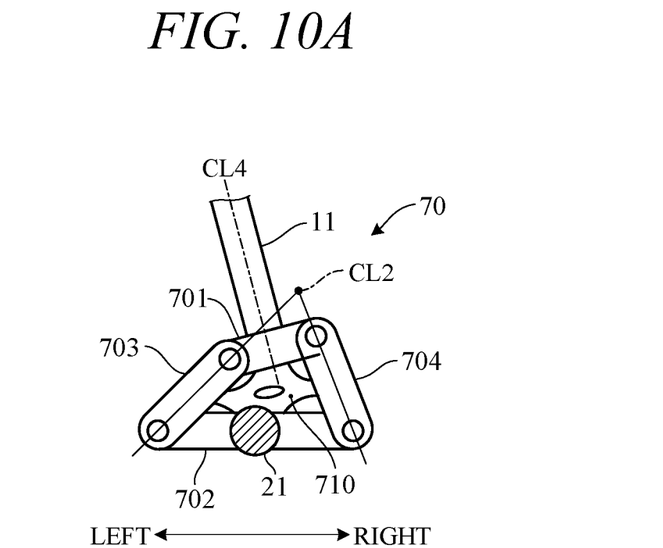
FIG. 10A is a diagram illustrating a state where a torque acts on a connecting portion of FIG. 9.
Figure 10B:
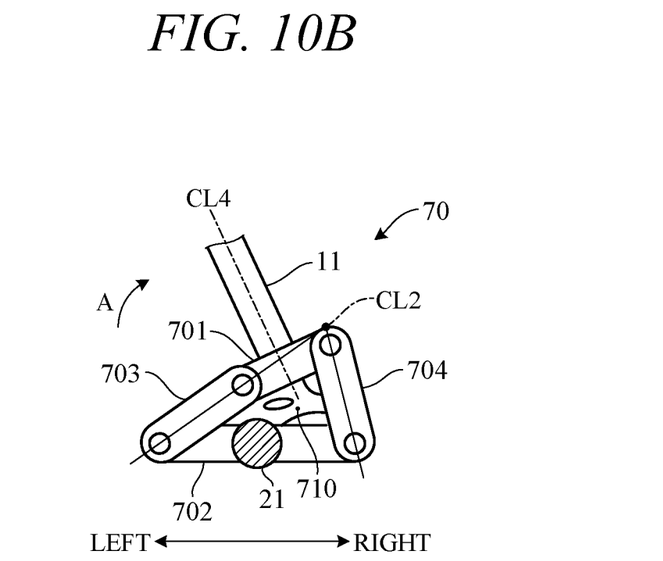
FIG. 10B is a diagram illustrating a state where a torque larger than one in FIG. 10A acts on the connecting portion of FIG. 9.

At this time, a force (restoring force) by the rubber block 710 for returning to the reference posture in which the swing angle is 0° increases as the swing angle increases, and thus a restoring force in FIG. 10B is larger than that in FIG. 10A. Furthermore, as the swing angle increases, the amount of positional deviation of the axial line CL2 in the left-right direction from the axial line CL4, in other words, the amount of positional deviation of the axial line CL2 in the left-right direction with respect to the rear main frame 21 increases. When torque acting via the main frame 11 is 0, the rubber block 710 returns to the original shape by an elastic force, and the front frame 10 returns to the reference posture in an upright state (FIG. 9).

By the connecting portion 70 being formed as the trapezoidal links in this manner, that is, by the connecting portion 70 being configured to include the horizontal link 701 (a first link) fixed to the front main frame 11, the horizontal link 702 (a second link) fixed to the rear main frame 21, the connecting links 703 (third link) rotatably connected to the left end portion of the horizontal link 701 and the left end portion of the horizontal link 702, and the connecting links 704 (fourth link) rotatably connected to the right end portion of the horizontal link 701 and the right end portion of the horizontal link 702 and having the same lengths as the connecting links 703, the position of the axial line CL2 that is the center of swing can be shifted in the left-right direction opposite to the swing direction. As a result, the maneuverability of the vehicle 100 can be changed. Accordingly, by the length of each of the links 701 to 704 included in the trapezoidal links being appropriately adjusted, the vehicle 100 can be formed such that optimum maneuverability is obtained. The front frame 10 (a first member) including the front main frame 11 and the rear frame 20 (a second member) including the rear main frame 21 may be swingably connected via a link mechanism other than the trapezoidal links. That is, as described above, another link mechanism may be used so that the amount of positional deviation in the left-right direction of the swing axial line CL2 from the center position in the left-right direction of the second member increases in accordance with the swing of the first member.

The above embodiment can be modified to various forms other than those described above. Some modifications will be described below. In the above embodiment, the vehicle 100 includes the single front wheel 1 and the pair of the left and right rear wheels 2, but a configuration of wheels is not limited to those described above as long as one front wheel arranged on the center line of the vehicle and two rear wheels arranged in both left and right of the center line are included. One front wheel includes not only a single front wheel but also, for example, a pair of front wheels included in one position, that is, pair front wheels.

Although in the above embodiment, the vehicle 100 is formed such that an occupant (user PS) gets on the vehicle in a standing posture, the vehicle may be formed such that a seat on which the occupant is seated is included and the occupant gets on the vehicle in a seated posture. Also in this case, a placement part may be provided such that the load points acting on the steps (placement part) by the weight of the occupant are positioned in the area connecting the ground point of the front wheel and the ground points of the pair of the left and right respective rear wheels in plan view.

Although in the above embodiment, the front frame 10 (a first member) is configured so as to rotatably support the front wheel 1 and steerably support the front wheel 1 in accordance with an operation of the handlebar (steering part), and the rear frame 20 (a second member) is configured so as to rotatably support the rear wheels 2 and integrally include the steps 25, the configurations of the first member and the second member are not limited to those described above.

Although in the above embodiment, the steps 25 (placement portions) are provided above the lateral frame 22, a placement part may be supported in any form as long as the placement part is supported by the second member. That is, the placement part may be directly supported from the second member, or may be indirectly supported via an intermediate member.

The above explanation is an explanation as an example and the present invention is not limited to the aforesaid embodiment or modifications unless sacrificing the characteristics of the invention. The aforesaid embodiment can be combined as desired with one or more of the aforesaid modifications. The modifications can also be combined with one another.

REFERENCE SIGNS LOST 1 front wheel, 2 rear wheel, 4 traveling motor, 6 battery, 7 connecting portion, 8 coil spring, 10 front frame, 14 handlebar, 20 rear frame, 25 step, 70 connecting portion, 100 vehicle, 701,702 horizontal link, 703,704 connecting link, Pa load point, P1,P2 ground point, CL2 axial line, AR area

The invention claimed is:

1. A vehicle, comprising:
a front wheel arranged on a center line extending in a front-rear direction, the front wheel being configured by a single wheel;
rear wheels arranged on a left side and a right side of the center line, the rear wheels being configured by a pair of left and right rear wheels;
a steering part arranged above the front wheel;
a first member configured to rotatably support the front wheel and support the front wheel in a steerable manner by the steering part;
a second member arranged behind the first member to rotatably support the pair of left and right rear wheels;
a placement part supported by the second member so that feet of an occupant are placed on the placement part;
a connecting part configured to connect the first member and the second member swingably in a left-right direction about an axial line extending in the front-rear direction; and
a biasing part configured to apply a turning force about the axial line to the first member so that the front wheel takes a reference posture in which a rotary shaft of the front wheel is directed in a horizontal direction, wherein
the biasing part includes a damper,
the damper includes a shaft member, a block member fixed to the shaft member, a plurality of elastic members disposed so as to face a plurality of concave surfaces provided at the block member, and a case member disposed around the plurality of elastic members to restrict movements of the plurality of elastic members,
the placement part includes a pair of left and right placement portions on the left side and the right side of the center line, and
the second member includes a single main frame disposed between the pair of left and right placement portions and extending along the center line in the front-rear direction.

2. The vehicle according to claim 1, wherein
the placement part is provided so that a load point acting on the placement part by a weight of the occupant is positioned inside an area obtained by connecting a ground point of the front wheel and ground points of the pair of left and right rear wheels in a plan view.

3. The vehicle according to claim 2, wherein
the pair of left and right placement portions are provided so that the load point acting on each of the pair of left and right placement portions is positioned inside the area in the plan view.

4. The vehicle according to claim 2, wherein
the connecting part is provided so that the axial line is inclined downward toward a rear.

5. The vehicle according to claim 1, wherein
a diameter of the front wheel is larger than diameters of the rear wheels.

6. The vehicle according to claim 4, wherein
the placement part is provided so that the load point is positioned below the axial line on a virtual plane orthogonal to the axial line.

7. The vehicle according to claim 1, wherein
the biasing part includes an elastic connecting portion elastically connecting the first member and the second member.

8. The vehicle according to claim 1, wherein
the biasing part includes a pair of left and right biasing members arranged on a left side and a right side of the axial line.

9. The vehicle according to claim 1, wherein
the placement part is arranged in front of the rear wheels.

10. The vehicle according to claim 1, further comprising
an electric motor driving the front wheel; and
a battery supplying an electric power to the electric motor.

11. The vehicle according to claim 10, wherein
the first member includes a holder to support the battery.

12. The vehicle according to claim 10, wherein
the battery is arranged inside the first member.

13. The vehicle according to claim 1, wherein
the second member includes a lateral frame fixed to the single main frame and extending in the left-right direction, and
the pair of left and right placement portions are attached to the lateral frame.

14. The vehicle according to claim 1, wherein
the pair of left and right placement portions are formed so that feet of a user in a standing posture are placed thereon.

15. The vehicle according to claim 1, further comprising
a pair of left and right fenders extending from front sides to rear sides through upper sides of the rear wheels so as to cover the rear wheels.

* * * * *